United States Patent
Pognant et al.

(10) Patent No.: US 10,554,433 B2
(45) Date of Patent: Feb. 4, 2020

(54) METHOD FOR DISCOVERING THE CONFIGURATION OF A HOME-AUTOMATION FACILITY

(71) Applicant: SOMFY SAS, Cluses (FR)

(72) Inventors: Sylvain Pognant, Seynod (FR); Hubert Cosserat, Annemasse (FR)

(73) Assignee: SOMFY SAS, Cluses (FR)

( * ) Notice: Subject to any disclaimer, the term of this patent is extended or adjusted under 35 U.S.C. 154(b) by 150 days.

(21) Appl. No.: 15/740,701

(22) PCT Filed: Jun. 30, 2016

(86) PCT No.: PCT/FR2016/051633
§ 371 (c)(1),
(2) Date: Jun. 4, 2018

(87) PCT Pub. No.: WO2017/006020
PCT Pub. Date: Jan. 12, 2017

(65) Prior Publication Data
US 2018/0287814 A1 Oct. 4, 2018

(30) Foreign Application Priority Data
Jul. 3, 2015 (FR) .................... 15 56297

(51) Int. Cl.
*G06F 15/16* (2006.01)
*H04L 12/28* (2006.01)
*H04L 12/24* (2006.01)

(52) U.S. Cl.
CPC .......... *H04L 12/2807* (2013.01); *H04L 41/08* (2013.01); *H04L 41/12* (2013.01)

(58) Field of Classification Search
CPC ...... H04L 41/12; H04L 41/08; H04L 12/2807
See application file for complete search history.

(56) References Cited

U.S. PATENT DOCUMENTS

| 6,192,282 B1 * | 2/2001 | Smith | G05B 15/02 |
| | | | 340/12.53 |
| 6,466,234 B1 * | 10/2002 | Pyle | G06F 8/38 |
| | | | 715/771 |

(Continued)

FOREIGN PATENT DOCUMENTS

EP 2362368 A2 8/2011

OTHER PUBLICATIONS

International Search Report for International Application No. PCT/FR2016/051633 dated Sep. 20, 2016 (2 pgs).

*Primary Examiner* — Hieu T Hoang
(74) *Attorney, Agent, or Firm* — Cantor Colburn LLP

(57) ABSTRACT

The invention concerns a method for discovering the configuration of a home-automation facility, the home-automation facility comprising a plurality of home-automation devices and a plurality of central control units (U1, U2); the method being executed by a management unit (Sv) or by a mobile terminal (T) connected to the at least one home-automation facility and comprising the following steps: receiving (EDCfT3) a first message (MSScn1) originating from a first control unit (U1) of the plurality of central control units (U, U1, U2), the first message comprising a first piece of signalling information concerning at least one first sub-scenario (SScn11) prerecorded in said first central control unit linked with a scenario identifier (ScnID), the first sub-scenario (SScn1) comprising at least one first control intended for the at least one device attached to said first central control unit (U1); receiving (EDCfT4) a second message (MSScn2) originating from a second control unit (U2) of the plurality of central control units (U1, U2), the second message comprising a second piece of signalling information concerning at least one second sub-scenario (SScn2) prerecorded in said second central control unit (U2) linked with the scenario identifier (ScnID), the second (Continued)

sub-scenario (SScn2) comprising at least one second control intended for the at least one device attached to said second central control unit (U2); reconstituting (EDCfT5) a scenario (Scn) associated with the scenario identifier (ScnID) comprising at least the at least one first control and the at least one second control, by combining the first sub-scenario (SScn1) and the second sub-scenario (SScn2).

8 Claims, 7 Drawing Sheets

(56) References Cited

U.S. PATENT DOCUMENTS

| | | | | |
|---|---|---|---|---|
| 8,336,066 B2* | 12/2012 | Murakami | ......... | H04L 12/2827 709/247 |
| 2004/0054789 A1* | 3/2004 | Breh | ................ | H04L 12/2803 709/229 |
| 2008/0313228 A1* | 12/2008 | Clark | ................ | G05B 19/058 |
| 2010/0031273 A1* | 2/2010 | Stephan | ............... | H04L 41/044 719/318 |
| 2010/0067872 A1 | 3/2010 | Jung et al. | | |
| 2014/0172184 A1* | 6/2014 | Schmidt | ................ | G05B 15/02 700/295 |
| 2014/0358285 A1* | 12/2014 | Aggarwal | ............. | G05B 15/02 700/275 |
| 2015/0113172 A1* | 4/2015 | Johnson | ................ | H04L 67/34 709/245 |
| 2015/0193522 A1* | 7/2015 | Choi | ................... | G06F 16/285 707/737 |
| 2015/0195100 A1* | 7/2015 | Imes | .................... | H04L 12/282 455/420 |
| 2015/0276253 A1* | 10/2015 | Montalvo | ............. | G06Q 10/06 700/276 |
| 2017/0008162 A1* | 1/2017 | Tsubota | ................ | G05B 19/00 |

* cited by examiner

METHOD FOR DISCOVERING THE CONFIGURATION OF A HOME-AUTOMATION FACILITY

CROSS REFERENCE TO RELATED APPLICATIONS

This application is a National Stage of PCT Application No. PCT/FR2016/051633 filed on Jun. 30, 2016, which claims priority to French Patent Application No. 15/56297 filed on Jul. 3, 2015, the contents each of which are incorporated herein by reference thereto.

TECHNICAL FIELD

This present invention concerns a method for discovering the configuration of a home automation installation.

BACKGROUND

A home automation installation of a building may comprise a plurality of home automation devices. It is known to proceed to the configuration, the control and/or the supervision of said installation by using a central control unit which communicates with one or more home automation device(s).

In the case of large buildings, it may be necessary either to use repeaters or to proceed to the installation of several central units in order to allow access to all home automation devices that are part of the installation. Moreover, in the case of disparate home automation installations, wherein many types of home automation devices must be monitored, it may also be desirable to use several central control units that allow communicating in the different communication protocols used by the home automation devices.

If the presence of these different units allows communicating with all the devices, the architecture thus constituted is complex to master for a user.

BRIEF SUMMARY

The present invention aims to solve all or part of the drawbacks mentioned hereinabove.

For this purpose, the present invention concerns a method for discovering the configuration of a home automation installation, the home automation installation comprising a plurality of home automation devices and a plurality of central control units, the method being executed by a management unit or by a mobile terminal connected to the at least one home automation installation and comprising the following steps:

i. Receiving a first message from a first control unit among the plurality of central control units, the first message comprising a first signaling information concerning at least a first sub-scenario pre-registered in said first central control unit in connection with a scenario identifier, the first sub-scenario comprising at least a first command intended for at least one device attached to said first central control unit.

ii. Receiving a second message from a second control unit among the plurality of central control units, the second message comprising a second signaling information concerning at least a second sub-scenario pre-registered in said second central control unit in connection with the scenario identifier, the second sub-scenario comprising at least a second command intended for at least one device attached to said second central control unit.

iii. Reconstituting a scenario associated with the scenario identifier, comprising at least the at least a first command and the at least a second command, by combination of the first sub-scenario and of the second sub-scenario.

Thanks to the arrangements of the invention, it is possible to use numerous central control units within the same installation in order to extend the number of types of home automation devices or the number of home automation protocols that can be used in the same installation or to increase the total number of the installation devices, while preserving an identification of belonging of the different home automation devices to the same installation.

In particular, it is possible to carry out a pre-programming of the scenarios, facilitating the automation of the operation of the installation and allowing a simplification of the user interface, thanks to the sub-scenarios attached to a global scenario identifier which hide the actual attachment of the devices to the central control units.

Each central control unit has a memory enabling it to store the home automation devices attached thereto, possibly groups of devices and scenarios or sub-scenarios defined and associated with these devices.

A user terminal connected to this local area network can, thanks to the arrangements of the invention, collect the information from the central control units and reconstitute this information to present it to the user. In particular, the association of a unique identifier to each scenario enables the user terminal to reconstitute a global scenario from sub-scenarios distributed on the different central control units, without these units having to communicate with each other or knowing the other sub-scenarios.

These arrangements allow using a terminal, or an application on a terminal that has no memory of the configuration of the installation, apart from the connection parameters on the central control units, while giving the user a global vision of the scenarios implementing several central control units.

They also allow finding on a user terminal a scenario configuration that has been defined by another user terminal.

Scenario means a set of commands comprising at least one command intended for at least one home automation device, said set being pre-registered during a configuration method in at least one central control unit, the scenario being able to be triggered based on a command of the user, an event triggered by the achievement of a time and/or date condition, or a condition on a state variable of a home automation device that can be in particular a sensor measurement or a state variable of an equipment. A scenario can be identified by a scenario identifier.

It should be noted that home automation device means a home automation equipment and/or a sensor, or part of a home automation equipment or part of a sensor corresponding to a functional subset.

Moreover, message means a piece of information notified or received in the form of a synchronous or asynchronous call, which may also correspond to a local or remote function call.

Installation means a set comprising a plurality of home automation devices and a plurality of control units disposed in a single building or over a plurality of locations, each home automation device being linked to an electronic control unit among the plurality of electronic control units, the plurality of electronic control units forming a group under the monitoring of a user. The electronic devices forming groups of at least one home automation device attached to an electronic control unit.

The same device or the same control unit can belong to two different installations under the responsibility of two different users. For example, a home automation device corresponding to a heating system can be comprised in a first home automation installation comprising a set of devices comprised in a housing, under the monitoring of a user occupying the housing, and in a second home automation installation comprising a set of home automation devices corresponding to heating systems disposed in a plurality of housings under the monitoring of an administrator user of the heating equipment for the plurality of housings.

Central control unit of the home automation installation means an electronic unit comprising at least one processing unit to contain and execute at least one computer program, comprising at least one communication module intended to monitor and/or control at least one home automation device and at least one communication module with the management unit. The electronic unit can be independent or integrated into a home automation device. In the latter case, the communication module intended to monitor and/or control the device can be a communication module internal to the home automation device and/or a communication module intended to monitor and/or control other home automation devices. In some applications, a central control unit can communicate with the management unit via an intermediate management unit, for example a third-party service provider, whose intermediate management unit offers a service interface or API.

In the case of a local connection of a user terminal, a connection to the home automation installation means an individual connection to each of the central control units of the installation, according to a local communication protocol.

According to one aspect of the invention, the management unit is a server remotely connected to the at least one home automation installation, via a wide area network.

According to another aspect of the invention, the management unit is a central unit intended to be linked to one or more central control unit(s) on separate private or local area networks, or on the same local area network.

According to one aspect of the invention, the first and second signaling information can consist of a simple report of the existence of a sub-scenario, the content of the sub-scenario can be transmitted to the management unit or the terminal during subsequent exchanges. Alternatively, the content of the sub-scenario can be comprised in the message reporting the existence of this sub-scenario.

According to one aspect of the invention, the scenario is defined for a group of controlled devices corresponding to a subset of a group of devices attached to a representative entity of the home automation installation.

According to one aspect of the invention, the home automation installation is represented by a representative entity associated with a group of home automation devices corresponding to the plurality of home automation devices belonging to the installation.

According to one aspect of the invention, the method is executed by a management unit and further comprises a registration step in the representative entity of the scenario reconstituted in step iii, in connection with the identifier of the scenario.

The present invention also concerns a computer program product comprising code instructions arranged to implement the steps of a method described above, when said program is executed by a processor of a management unit or of a user terminal.

The present invention also concerns a system comprising a management unit or a user terminal arranged to execute the method described above, in a manner connected to at least one central control unit of a home automation installation.

The different aspects defined above that are not incompatible can be combined.

BRIEF DESCRIPTION OF THE DRAWINGS

The invention will be better understood using the detailed description exposed below with reference to the appended drawings wherein.

In the following detailed description of the figures defined above, the same elements or the elements fulfilling identical functions may preserve the same references in order to simplify the understanding of the invention.

DETAILED DESCRIPTION

Figure 1:
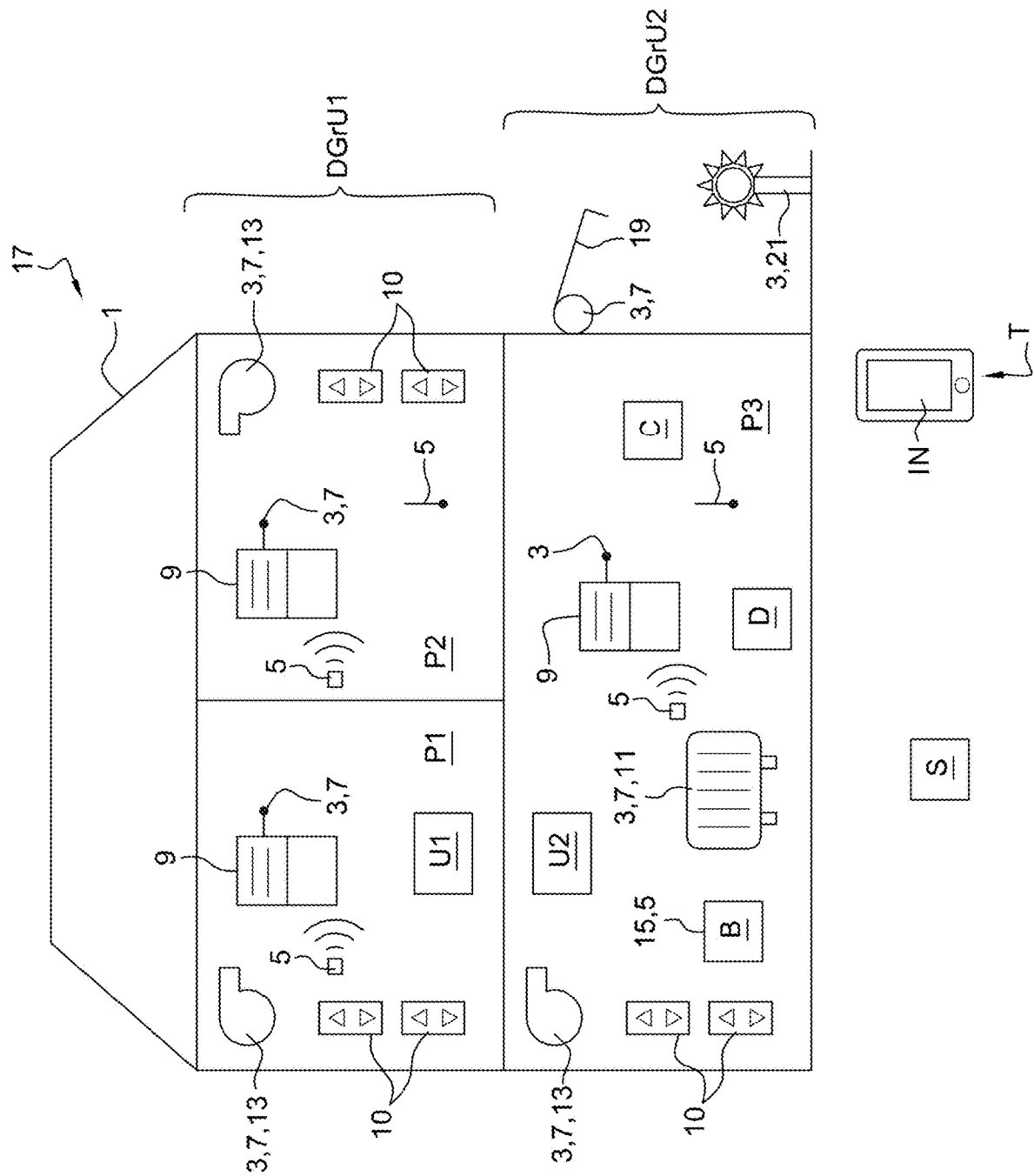
FIG. 1 is a schematic view of a building and of a home automation installation in accordance with one embodiment of the invention.

As illustrated in FIG. 1, a building 1 comprises for example three rooms P1, P2, P3. The building 1 also comprises home automation equipment 3 and sensors 5.

A home automation equipment 3 may be an actuator arranged to move or adjust an element of the building 1, for example an actuator 7 for moving a roller shutter 9 or a terrace awning 19, or a regulation system 10 for a heater 11 or an aeraulic system 13. A home automation equipment 3 can also be a lighting, for example a terrace outdoor lighting 21 or a lighting control system, an alarm system, or a video camera, especially a video surveillance camera.

The home automation installation 17 may also comprise a control point 15 of an actuator 7, such as a wireless control box B for the roller shutter 9.

The home automation installation 17 may comprise one or more sensor(s) 5, integrally to an actuator 7, to a control point 15 or to the control box B, or independently with these elements. A sensor 5 may, in particular, be arranged to measure a physical quantity, for example a temperature sensor, a sunlight sensor or a humidity sensor. Home automation equipment 3 position sensors 5 of the building 1, such as, for example, sensors for the open state of a roller shutter 9 or position sensors of a door leaf such as a window, motorized or not, may be also provided. The home automation installation may also comprise one or more presence sensor(s).

A home automation equipment 3 and a sensor 5 are thus to be considered as units having available information on observed actual states of the building 1 elements and being able to share this information with other elements of the home automation installation 17.

The home automation equipment 3 and the sensors 5 can thus have access to any measurable physical quantity, such as the temperature of each room P1, P2, P3 or a state of an element of the building 1, such as the open state of a roller shutter 9, the status of an alarm, etc.

The designation of home automation device or device D will thereafter be used indifferently to designate sensors or home automation equipment, or parts of home automation equipment 3 or sensors 5.

The home automation installation 17 comprises a plurality of central control units U1, U2. Particularly and as an example, two central control units U1, U2 are shown in FIG. 1.

Each central control unit U1, U2 is arranged to control and/or monitor part of the devices D of the installation 17 forming a group DGrU1, DGrU2. For example, in FIG. 1, the central control unit U1 is in charge of the devices D disposed in the rooms P1 and P2 of the first floor of the building, while the central control unit U2 is in charge of the devices D disposed in the room P3 on the ground floor of the building and of the outdoor devices.

Particularly, the control and/or the monitoring is carried out remotely, in particular by using a wireless communication protocol, for example a radio communication protocol. Each central control unit U1, U2 is arranged to group all the data coming from the devices D of its group DGrU1, DGrU2 and to process these data.

The devices D that are part of a group DGrU1, DGrU2 belong to a local area network managed by a central control unit U1 or U2 within the home automation installation and communicate according to a local communication protocol with the central control unit U1 or U2. They have a local address in this network. The logical devices D can be modeled as end nodes or endpoints in the local area network.

The local addressing system may be hierarchical or flat, the address format may be numerical or alphanumerical.

Figure 2:
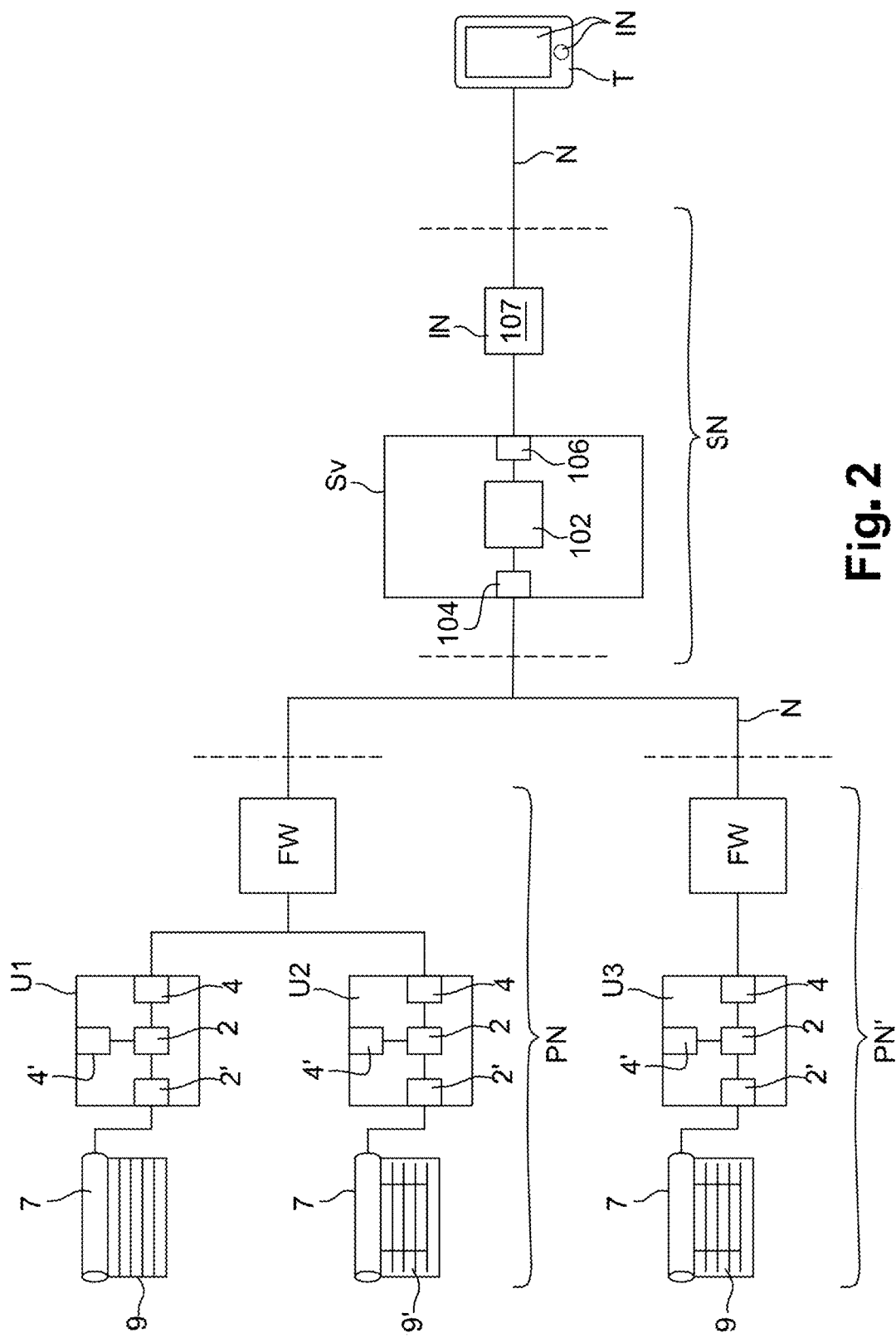
FIG. 2 is a diagram showing an architecture of a system comprising the home automation installation illustrated in FIG. 1 and a server intended to be connected to a user terminal.

As shown in FIG. 2, each central control unit U is arranged to communicate with a server Sv.

The central control units U1, U2, U3 are disposed on a private network PN, PN', whose access is generally protected by a firewall FW. Particularly, in the example shown in FIG. 2, two central control units U1, U2, are disposed on a first private network corresponding to a first home automation installation, while a third central control unit U3 is disposed on a second private network PN' independent of the private network PN corresponding to a second home automation installation. The server Sv is also disposed on a private network SN. The private network PN is linked to a wide area network N, for example Internet. Of course, the server Sv is arranged to communicate with a set of such central control units U. One of these units will described thereafter.

A central control unit U comprises a processing unit 2 arranged to contain and execute a first computer program. For example, the processing unit 2 comprises a processor, a storage flash memory as well as a random-access memory, and an Ethernet chip.

The central control unit U further comprises at least one communication module 2' intended to monitor and/or control home automation equipment 3 and/or sensors 5, the home automation equipment 3 may be actuators 7, lights 21, an alarm system or a video camera.

For example, as shown in FIG. 2, the communication module 2' allows monitoring and controlling at least one actuator 7, a movable element of the building 1, for example a roller shutter 9, or an orientable sunshade 9' or other actuators 7 or lights 21, as previously described with reference to FIG. 1.

For example, the communication module 2' can be arranged to implement for example one or more of the protocols Z-Wave, EnOcean, IO Homecontrol, somfy RTS, KNX, MODBUS, Wavenis, Philips HUE.

According to another possibility, for example under alarm systems, the central control unit can be integrated in the home automation device.

Receiving information from a sensor 5 providing a user with presence information or values of the surrounding parameters, such as temperature, humidity and brightness, is also provided. In the same way, the central unit U may allow monitoring and/or th controlling an alarm system.

Each central control unit U further comprises a communication module 4 with the server Sv. The server Sv allows the remote control and/or monitoring and comprises one or more processing unit(s) 102 arranged to contain and execute a second computer program.

Each central control unit U further comprises a communication module 4' to communicate according to a local communication protocol, for example Bluetooth or Wifi, with a mobile communication terminal T. The communication terminal T can contain and execute an application software APP.

In some applications, a central control unit U can communicate with the management unit via an intermediate server, for example a third-party service provider, whose intermediate server provides a service interface or API. The server Sv comprises, for its part, at least one communication interface 104 intended for the communication with the central unit U.

The server Sv may also comprise a communication interface 106 intended for the communication with a control and/or monitoring interface IN allowing a user to remotely monitor the home automation installation.

It should be noted that the word server is a logical designation that can cover the use of multiple physical servers to distribute the computer processing load to achieve.

The control and/or monitoring interface IN comprises, for example, a web server 107 and a mobile communication terminal T communicating via the wide area network N. The mobile communication terminal T may be, for example, a smartphone or a tablet. The mobile communication terminal T may be the same or a terminal of the same type as the one with which the central control unit U communicates locally by means of the communication module 4', or a different terminal. These mobile terminals will be designated indifferently by the reference T.

The control and/or monitoring interface IN comprises a processor that can be disposed at the web server 107 and/or the mobile communication terminal T.

The processor of the control and/or monitoring interface IN is arranged to use a third computer program. This third computer program is in turn arranged to execute a downloadable application.

The mobile communication terminal T comprises a data input device and a display device, for example in the form of a part of a touch control of a screen of the terminal T and in the form of one or more button(s) of the terminal T.

FIGS. 1 and 2 describe an installation 17 which comprises a set of devices D and a plurality of central control units U1, U2 disposed in the same housing, the same building or the same physical location.

According to another possibility, an installation 17 within the meaning of the invention may comprise home automation devices disposed on a plurality of locations, with at least one central control unit on each of these locations to which the home automation devices are attached, the central control units U of the installation being placed under the monitoring of a user.

For example, such an installation may comprise a set of home automation devices constituted of heating systems distributed in a set of housings or tertiary premises, attached to a set of central control units U, the set of home automation devices being intended to be controlled by a specific user in charge of the heating for said set of housing or tertiary premises.

Figure 3:
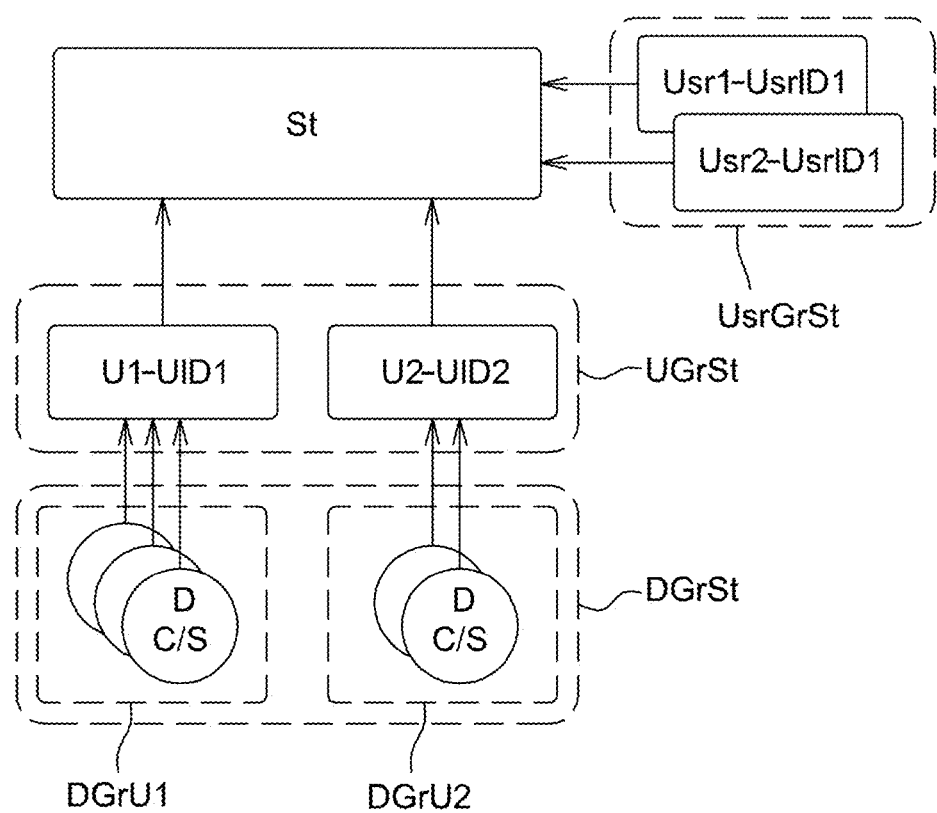
FIG. 3 is a diagram showing the relations between a representative entity of a home automation installation, the central control units and the devices of the home automation installation.

The representation of the installation 17 by a representative entity St on the server Sv will now be described with reference to FIG. 3, in the case where the installation comprises multiple central control units U.

The system according to the invention attaches several central control units U to a single object St representing an installation 17 by a configuration at the server Sv.

The server Sv can thus present to the user the installation 17 as a single set of devices D to the user, for example via an Application Programming Interface or API, in which each device D can accept given set of commands C or present state variables S.

The server Sv can also use an abstraction system or layer for the commands C and the state variables S in order to provide a more generic API independent of the communication protocol used by a given device D.

The identification of the representative entity St of the installation can be according to one embodiment carried out by any one of the identifiers UID of one of the central control units U present in the installation, by an identifier of the installation and/or of the user.

Thus, to simplify the designation of an installation in the public APIs, it is sufficient that the users of these APIs provide a unique identifier attached to the representative entity St of the installation 17.

Internally to the server, a unique identifier of the representative entity St of the installation 17 may exist to facilitate the implementation.

Thus, the representative entity St can be associated with a list or group of devices DGrSt grouping together the devices contained in the different groups DGrU1, DGrU2 attached to each central control unit U1, U2, and to a group UGrSt of identifiers UID of the concerned central control units U. The devices are identified by a unique identifier. A representative entity of a home automation installation may be associated with a given user Usr1, identified by an identifier UsrID, corresponding for example to a login and password combination or with a given user group UsrGrSt.

An exemplary embodiment of a unique identifier of a device DURL will now be described.

According to this embodiment, the unique identifier of a device DURL comprises information on:

The local native protocol of the home automation device ID,

The communication path toward the device D, including the intermediate central control units U and the termination addresses to cross, organized or not in a hierarchical topology;

A subsystem identifier subsystemId if the device comprises several functional subsets or subsystems that can be addressed separately. The devices that comprise only one functional set do not have an identification extension of a subsystem.

Thus, the form of the unique identifier of a device DURL may be as follows:

<protocol>://<gatewayId>/<rawDeviceAddress>(#<subsystemId>)

In which the following fields are present:

protocol: identifier of the native device local protocol;

gatewayId: identifier of the first central control unit U, for example a serial number or a unique identifier.

rawDeviceAddress: a simple or multilevel path. Its meaning and its format depend on the addressing scheme of the local communication protocol of the device D.

subsystemId: this optional field indicates an identification, for example a rank of the subsystem (starting for example at 1), if such a subsystem is present.

EXAMPLES 1. knx://0201-0001-1234/1.1.3

This unique identifier of a device DURL corresponds to a device D communicating via the protocol KNX with an individual address 1.1.3 accessible by the central control unit U carrying the identifier #0201-0001-1234.

2. io://0201-0001-1234/145036#2

This unique identifier of a device DURL corresponds to a subsystem carrying the number 2 associated with a device D communicating via the protocol homecontrol with a radio address 145036 accessible by the central control unit U carrying the identifier #0201-0001-1234.

The manipulations of the data relating to the devices D at the server Sv are made by an execution process or service ES. In order to store the data relating to the different device instances D mentioned above, the execution service can access to an instance database IDB. Of course, these different types of instances can also be stored separately. Furthermore, database means here a storage mode suitable for a set of instances, which can be stored in a list, a tree or tables or any other appropriate data structure.

Figure 4:
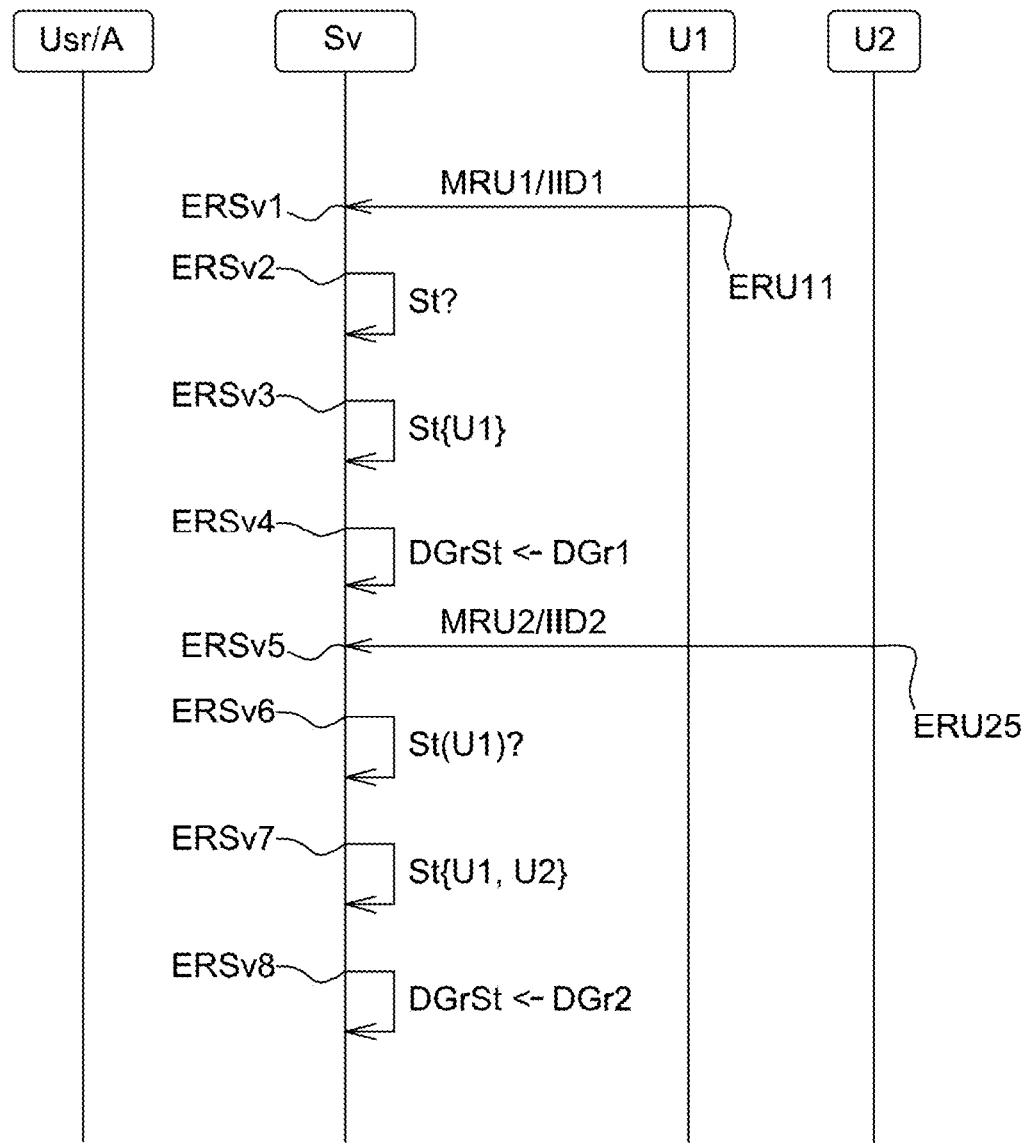
FIG. 4 is a diagram illustrating a mode of implementation of a method for registering a central control unit of a home automation installation to a management unit according to the invention.

A method for registering the central control units U will now be described with reference to FIG. 4, with a server Sv connected to the at least one home automation installation 17.

In a first step ERSv1, the server Sv receives at least one registration request message MRU1 from at least a first central control unit U1 for the installation 17, transmitted in a step ERU1 by a first central control unit U1, and/or by a user terminal T, based on an identification information IID1.

The identification information may correspond, for example, to an identifier of a central control unit already belonging to a representative entity, and/or to an identifier of the user UsrID under whose responsibility the registration is made and/or directly to an identifier of a representative entity of an installation. The identification information may be contained in the message or deduced from the context, for example from a transmission network address of the message, or from characteristics relating to the communication session.

In a second step ERSv2, the server obtains an attachment information StI1 from the first central control unit U1 to a representative entity St of a home automation installation 17. If the attachment information corresponds to an absence of attachment of the unit control unit U1 to a previously registered installation 17, the server proceeds, in a third step ERSv3, to the creation of a representative entity of the installation 17 and attaches the first central control unit U1 to this representative entity St. This is in particular the case upon the registration of a first central control unit U1 of a given installation.

In the case where a central control unit U is already paired with one or more device(s) D of a group DGrU1, the representative entity St is updated in a fourth step ERSv4 to represent these devices in the group of devices DGrSt attached to the representative entity of the installation 17. Thus, the group of devices DGrSt is updated. The information required to update the representative entity St may be present in the message MRU2, or may be the subject of additional exchanges with the server Sv in order to obtain identification elements of the concerned devices D.

In a fifth step ERSv5, the server Sv receives at least one registration request message MRU2 from a second central control unit U2 for the installation 17, transmitted in a step ERU1 by a second central control unit U2, and/or by a user terminal T, based on an identification information IID2.

As seen previously, the identification information may correspond, for example, to an identifier of a central control unit already belonging to a representative entity, and/or to an identifier of the user UsrID under whose responsibility the registration is performed, and/or to an identifier of the installation 17.

In a sixth step ERSv6, the server Sv obtains attachment information StI2 from the second central control unit U2 to a representative entity St of a home automation installation 17.

In a seventh step ERSv7, the server Sv attaches the second central unit to a representative entity St of the installation 17 to which is also attached the first central control unit U1 for the same user UID1.

In the case where the central control unit U2 is already paired with one or more device(s) D of a group DGrU2, the representative entity St is updated in an eighth step ERSv8 to represent these devices in the group of devices DGrSt attached to the representative entity of the installation 17. Thus, the group of devices DGrSt is updated. The information required for the updating of the representative entity may be present in the message MRU2, or may be the subject of additional exchanges with the server Sv in order to obtain identification elements of the concerned devices D.

Thus, the central control units U1 and U2 are considered as attached to the same representative entity St of an installation, which groups together all the devices D of the installation indifferently attached to the first or the second central control unit in the same group DGrSt that can be communicated to a user terminal T. These arrangements are obtained without communication between the central control units, but simply by the logical attachment made upon the registration.

The interface presented to the user can thus add an abstraction layer to hide the actual attachment of the devices to the central control units U. The interface thus represents the home automation equipment, such as shutters, awnings, HVAC or lighting systems, controllable in the installation as well as the present sensors.

If the devices D are then attached to a representative entity of the installation, the attachment information of the home automation devices D to the central control units U are however transmitted to the server Sv, for integration into the data structure, with the aim of the routing of the messages toward the concerned central control unit in case of command by the Server Sv. Particularly, the identifier of the central control unit to which a product is attached can be contained in the identifier DURL.

A central control unit U can be detached from the representative entity St of an installation. When a central control unit U is detached, all the devices that are managed via the central control unit are removed from the group of devices DGrSt of the representative entity St of the installation 17. Thus, it is possible to provide that a central unit cannot be detached if the representative entity St comprises dependencies on the devices D managed by this central control unit U, as scenarios. These dependencies must be removed before the central control unit U can be detached.

In case of pairing of a new device D with a central control unit U, or on the contrary removal of a device, or in case of its modification, an update message is sent to the server Sv in order to also update the list of devices DGrSt dependent on the representative entity St.

Thanks to this registration method, the server Sv can therefore provide on the interface IN a description of the installation 17, thanks to the use of the representative entity in the form of a group of devices D, contained in the group of devices DGrSt, which have state variables S but also available commands C.

It is hence possible to control and monitor via the interface all the devices of the installation independently of their attachment to the central units U.

Figure 5:
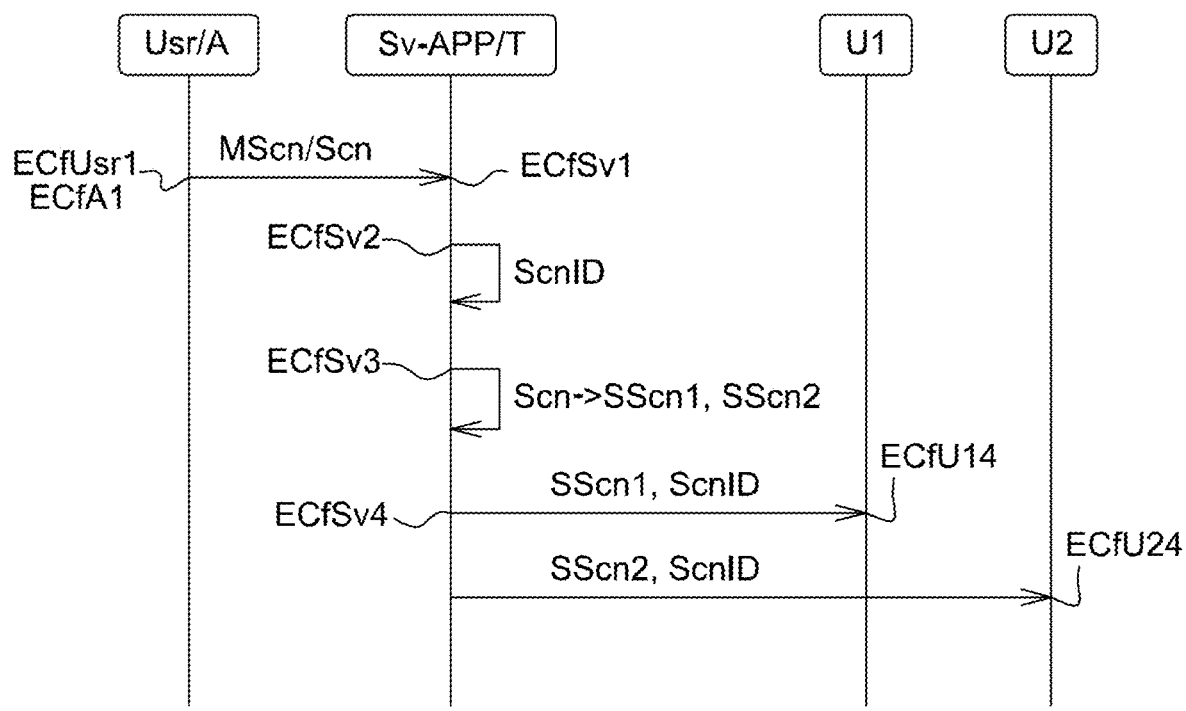
FIG. 5 is a diagram illustrating a mode of implementation of a method for configuring a home automation installation according to the invention.

A method for configuring at least one home automation installation 17 of a building 1 will now be described with reference to FIG. 5. It will be assumed that the configuration method is carried out after the previously described registration method. Thus, the central control units U1 and U2 are attached to the representative entity St, and the devices D are identified in the group of devices DGrSt attached to the installation.

It is possible in a first step ECfUsr1 for the user Usr or a third-party application in a step ECfA1 to define scenarios Scn implementing several devices D of the same home automation installation 17 but attached to separate central control units U1 or U2. The definition of the scenario Scn is received and registered by the server Sv in a step ECfSv1.

A scenario Scn comprising a set of commands C intended for a plurality of home automation devices D will be considered here, said plurality comprising at least a first home automation device D1 paired with a first central control unit U1 and a second device D2 paired with a second central control unit U2.

In a second step ECfSv2, the server Sv assigns a scenario identifier ScnID to the scenario defined in the previous step.

In a third step ECfSv3, the server Sv partitions the scenario Scn into at least two sub-scenarios SScn1 and SScn2 corresponding to parts of scenario to be performed by each of the control units U1 and U2 in connection with the devices D belonging to the group of devices DGrU1 or DGrU2 attached to the corresponding central unit U1 or U2.

In a fourth step ECfSv4, the server sends the sub-scenarios and the scenario identifier ScnID to the corresponding central control units U1, U2, the corresponding sub-scenarios SScn1, SScn2 being registered in the central control units in connection with the same scenario identifier ScnID.

Thanks to these arrangements, the scenario is registered on the central control units by parts SScn1, SScn2 with a reference to said scenario identifier ScnID. It is then possible for a user to control the execution of this scenario either locally by direct access to the central control units, or remotely via the server Sv, as will be detailed below. In both cases, the triggering of the execution of this scenario Scn can be obtained uniformly for all the control units U1, U2, by simply referring to the (unique) identifier ScnID.

According to one variant of the method, all the steps can be carried out by an application APP on a mobile terminal T instead of the server Sv. In this case, the definition step can be carried out via a graphical interface of the application.

Once the different sub-scenarios are registered in the central control units U, it is possible later that this configuration is discovered via the server Sv or an application executed on a user terminal T connected to the installation.

Figure 6:
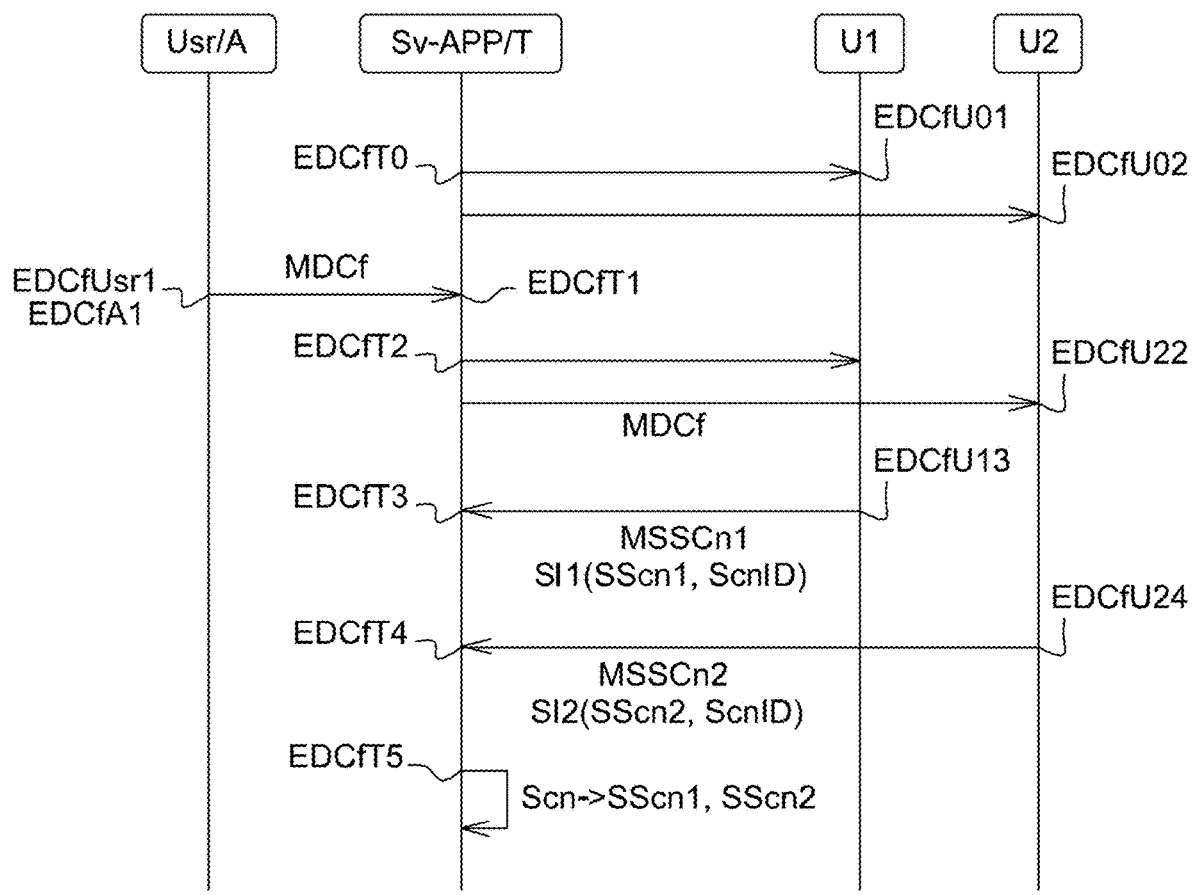
FIG. 6 is a diagram illustrating a mode of implementation of a method for discovering the configuration of a home automation installation according to the invention.

The method for discovering the configuration will now be described with reference to FIG. 6. It will be assumed here that the method is performed by a mobile user terminal, for example executing an application APP.

This terminal is connected in a prior step EDCfT0 locally individually to the central control units U of the installation 17, by using a local protocol, such as a protocol of the type Bluetooth, Zigbee or Wifi. The terminal or the application APP executed on this terminal T will be thereafter designated indifferently by terminal.

In a step EDCfT1, a message MDCf or a configuration discovery instruction is received from, for example, a user or a third-party application. Alternatively, the instruction may correspond to a periodic search of the configuration. The steps EDCfT0 and EDCfT1 can be switched, the connection can be established after receiving the discovery instructions.

In a step EDCfT2, the terminal can send a discovery message to the plurality of central units U with which it is able to communicate, in order to request messages in return. It will be assumed in the present case that two central control units U1 and U2 are present in the installation and accessible to the terminal T.

Thereafter, in a first receiving step EDCfT3, the terminal receives a first message MSScn1 from a first control unit U1. The first message comprises a first signaling information SI1 concerning at least a first sub-scenario SScn1 pre-registered in said first central control unit in connection with a scenario identifier ScnID, as configured in the configuration method described above.

In a second receiving step EDCfT4, the terminal receives a second message MSScn2 from a first control unit U2. The second message comprises a second signaling information SI1 concerning at least a second sub-scenario SScn2 pre-registered in said second central control unit in connection with the same scenario identifier ScnID, as configured in the configuration method described above.

In order to define the correspondence between the identified sub-scenarios and scenarios, the terminal can maintain a list of received identifiers during the discovery method.

Then, during a reconstitution step EDCfT5, the terminal T reconstitutes the scenario Scn associated with the scenario identifier ScnID comprising at least the at least first command C1 and the at least second command C2, by combining the first sub-scenario SScn1 and the second sub-scenario SScn2;

It should be noted that there may be an additional exchange between the terminal T and the central control units so that the central control units communicate the description of the devices D which are attached to each central control unit, before communicating the signaling information SI corresponding to the registered scenarios.

According to one variant, the connection of the terminal to the central control units can be made via Internet.

Considering the example of the installation described with reference to FIG. 1, it can be considered as previously that the first central control unit U1 is in charge of the devices D disposed in the rooms P1 and P2 of the first floor of the building, while the central control unit U2 is in charge of the devices D disposed in the room P3 on the ground floor of the building and of the outdoor devices.

The user was able to define scenarios for the first-floor devices and scenarios for the ground floor devices.

Following the execution of the discovery method, the terminal will be able to identify that 2 boxes are present in the system, and will also see the associated actuators, and the existing scenarios.

From its terminal, a user X will also be able to create a new scenario staging any of the actuators of the system. He can create, for example, a scenario Scn "close the whole house" involving all actuators of the door leaves of the installation; the identifier scnID of this new scenario is then transmitted to each of the central control units U1 and U2. The central control units U1 and U2 do not know the complete definition of the scenario Scn; they know it only for the actuators attached thereto.

When another inhabitant Y of the place will launch his own application on its own terminal T, he will be able to discover all the configuration stored in each central control unit U; he will see all the scenarios including the distributed scenario Scn defined by the other user.

A control method will now be described with reference to FIG. 7, in a case where the command is generated remotely via the user interface IN and the server Sv and in the case of a scenario control Scn.

In a first step ECSv1, the server Sv receives a control message MC from a user Usr or an application A relating to a request to execute a scenario.

It will be assumed that the control message MC contains a request to execute the scenario Scn, identified by the scenario identifier ScnID, configured during the example of the configuration method described above, which corresponds to carrying out a sub-scenario SScn1 on the central control unit U1 and to carrying out a sub-scenario SScn2 on the central control unit U2.

In such a case, it is possible that the correspondence between the execution of the sub-scenarios Scn1 and Scn2 and of the scenario Scn is stored in the memory for an appropriate error management. Particularly, the execution service ES may implement a state automaton for this purpose.

Thus, in a step ECSv2, the server proceeds to the establishment of a list of central control units U among the plurality of central control units concerned by the scenario Scn comprising at least said first central control unit U1 and said second central control unit U2.

Moreover, the server Sv establishes in a step ECSv2' the correspondence between the execution result of the scenario Scn and the respective execution results of the two sub-scenarios SScn1 and SScn2, this correspondence being able to be stored in the memory or in the database.

In a third step ECSv3, a first control message MSScn1 is sent to the central unit U1 of the home automation installation 17 in order to execute the sub-scenario SScn1. As previously explained, the sub-scenarios SScn1, SScn2 can be registered in the central units U1, U2, in connection with the same scenario identifier ScnID. The message MSScn1 contains in this case a simple reference to the identifier ScnID.

In the example shown, it is assumed that the return of this first command corresponds to a success in carrying out the sub-scenario with a return code RSSc1, sent by the central control unit U1 in a step ECU13. The execution service can store this success value.

In a step ECSv4, a second control message MSScn2 is sent to the central control unit U2 of the home automation installation 17 in order to execute the sub-scenario SScn2. The message MSScn2 contains in this case a simple reference to the identifier ScnID. In the shown example, it is assumed that the return of the execution of the second sub-scenario corresponds to a failure, with return of a return code RSScn2, sent by the central control unit U2 in a step ECU24.

In a last step ECSv5, the execution service defines a response RScn to be returned to the user following the control message MC.

Since a sub-scenario result or a return code has been received for each executed sub-scenario, the results must be aggregated to simulate an overall result for the scenario Scn. Particularly, the scenario Scn is considered to be performed if all sub-scenarios SScn1, SScn2 have been carried out successfully, and failed if one or more sub-scenario(s) has/have failed.

Figure 7:
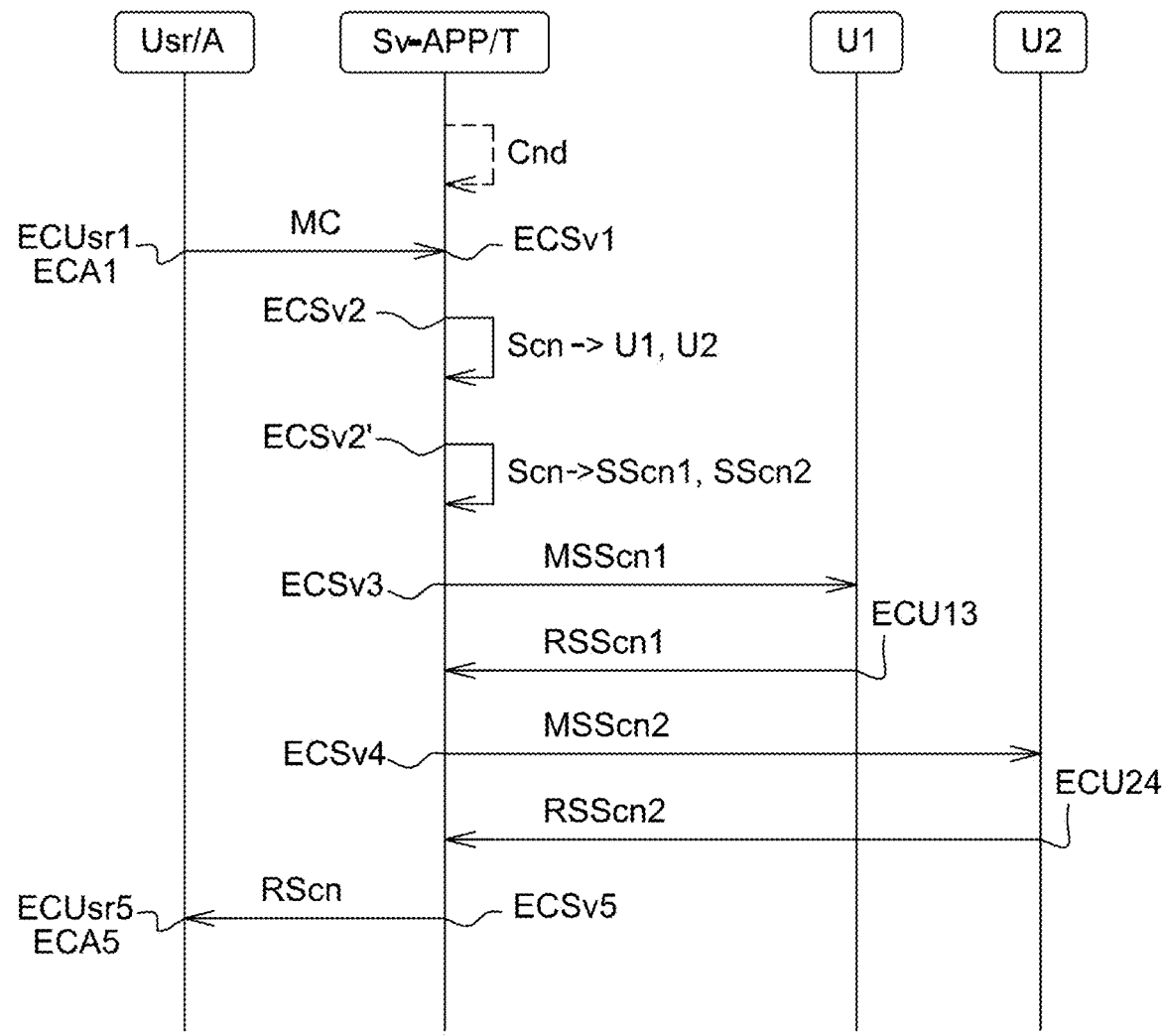
FIG. 7 is a diagram illustrating a mode of implementation of a method for controlling a home automation installation according to the invention.

In the case illustrated in FIG. 7, it can be considered that the scenario Scn has failed.

This response is communicated to the user Usr or to the application A which receives it in a step ECUsr5 or ECA5.

According to one variant of the method, all the steps can be carried out by an application APP on a mobile terminal T instead of the server Sv. In this case, the receiving step can be carried out by the communication of an order by the user via the graphical interface of the application.

According to one variant of the method, the control method can be triggered during the step ECSv1 by achieving a condition Cnd based on the time and/or at least a state variable of a device, the evaluation of the condition can be carried out either by the management unit or by the terminal. This step alternative to receiving a message is shown in FIG. 7 in dotted lines.

In the case where the evaluation of the condition is carried out by a third-party application that transmits a control message to the management unit or to the terminal, the receiving step is present as described previously. Particularly, the control message may come from a real-time management application executed on the management unit, if the condition concerns the time; or from a home automation device via the central control unit to which the device is attached, if the condition concerns a state variable of a home automation device.

The invention claimed is:

1. A method for discovering configuration of a home automation installation, the home automation installation comprising a plurality of home automation devices and a plurality of central control units; the method being executed by a management unit or by a mobile terminal connected to the home automation installation and comprising the following steps:
   i. Receiving a first message from a first control unit among the plurality of central control units, the first message comprising a first signaling information concerning at least a first sub-scenario pre-registered in said first central control unit in connection with a scenario identifier, the first sub-scenario comprising at least a first command intended for at least one device attached to said first central control unit;
   ii. Receiving a second message from a second control unit among the plurality of central control units, the second message comprising a second signaling information concerning at least a second sub-scenario pre-registered in said second central control unit in connection with the scenario identifier, the second sub-scenario comprising at least a second command intended for at least one device attached to said second central control unit;
   iii. Reconstituting a scenario associated with the scenario identifier comprising at least the at least one first command and the at least one second command, by combining the first sub-scenario and the second sub-scenario.

2. The method according to claim 1, wherein the scenario is defined for a subset of a group of devices attached to a representative entity of the home automation installation.

3. The method according to claim 1, wherein the home automation installation is represented by a representative entity associated with a group of home automation devices corresponding to the plurality of home automation devices belonging to the home automation installation.

4. The method according to claim 3, executed by the management unit and further comprising a registration step in the representative entity of the scenario reconstituted in step iii, in connection with the scenario identifier.

5. The method according to claim 2, wherein the home automation installation is represented by the representative entity.

6. The method according to claim 5, executed by the management unit and further comprising a registration step in the representative entity of the scenario reconstituted in step iii, in connection with the scenario identifier.

7. A non-transitory computer readable medium comprising code instructions arranged to implement the steps of the method according to claim 1, when said program is executed by a processor of a management unit or a user terminal.

8. A system comprising a management unit or a user terminal arranged to execute the method according to claim 1, in a manner connected to at least one central control unit of the home automation installation.

* * * * *